Oct. 18, 1949. D. A. WRIGLEY 2,485,468
THERMOCOUPLE FOR FIRE DETECTION
Filed April 13, 1949
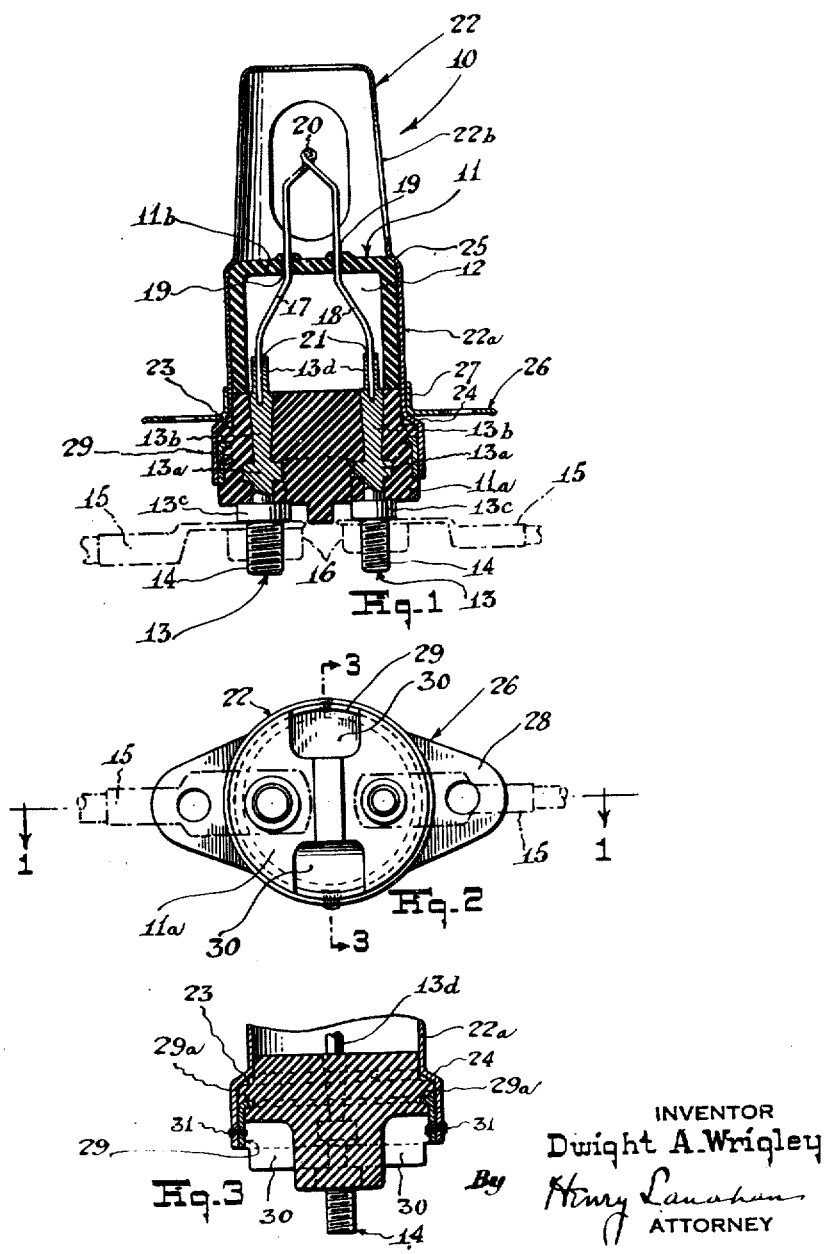
INVENTOR
Dwight A. Wrigley
By Henry Lanahan
ATTORNEY Patented Oct. 18, 1949

2,485,468

UNITED STATES PATENT OFFICE 2,485,468

THERMOCOUPLE FOR FIRE DETECTION

Dwight A. Wrigley, Chatham, N. J., assignor to Thomas A. Edison, Incorporated, West Orange, N. J., a corporation of New Jersey Application April 13, 1949, Serial No. 87,169

4 Claims. (Cl. 136—4)

This invention relates to thermocouples especially adapted for detecting fires on aircraft, and has for objects to provide an improved construction of such a thermocouple which is capable of withstanding engine oil fires under conditions of heavy vibration.

The invention is particularly an improvement on the construction shown and described in the pending application Serial No. 604,394 of Winslow B. M. Clark filed July 11, 1945 and having a common assignee with the present application.

Novel features in the present thermocouple construction lie (1) in using a moldable insulating material for the inner housing which is capable of withstanding oil fires and which has a temperature coefficient substantially equal to that of the surrounding metal sleeve, (2) in molding a metal member, having the same temperature coefficient, in interlocking relation with the housing to serve as a base for the shell, and (3) in arranging the housing so that the shell can be welded to the base ring whereby to provide a solid integral construction.

Other objects and features of my invention will be apparent from the following description and the appended claims.

In the description of my invention reference is had to the accompanying drawings, of which:

Figure 1 is a sectional view of a thermocouple embodying my invention, taken on the line 1—1 of Figure 2;

Figure 2 is a bottom view of this thermocouple; and

Figure 3 is a fractional section taken on the line 3—3 of Figure 2.

The thermocouple 10 shown in the accompanying drawings has an inner housing 11 of a refractory moldable insulating material. This inner housing comprises a solid cylindrical base 11a and a hollow cap 11b which seats on the base to enclose therewithin an air space 12.

Two studs 13, preferably of stainless steel, are molded into the base. These studs are diametrically opposite the central axis of the base and are parallel thereto. These studs have central portiosn provided with collars 13a and tapered shanks 13b which are molded in interlocking relation with the base. At their outer ends the studs have collars 13c in abutting relation with the outer end face of the base, and beyond these collars the studs have threaded portions forming terminals 14 to which are secured lead-connecting lugs 15 by means of nuts 16 both shown in dash-dot lines.

The studs 13 have hollow end portions 13d of reduced diameter extending beyond the inner face of the base and to which are secured, as by silver soldering, respective thermocouple wires 17 and 18 made for example of Chromel (nickel-chome-iron alloy) and constantan (copper-nickel alloy) respectively. These thermocouple wires extend snugly through apertures 19 provided in the end wall of the cap 11b and are joined together at a distance from the cap, at 20, by first twisting them and then welding and/or silver soldering them together. It will be understood that the points 21 where the thermocouple wires are joined to the studs 13 constitute so-called "cold" junctions and that the point 20 where the wires are joined together is their so-called "hot" junction.

The inner insulating housing 11 is encased in a tubular metal shell 22, preferably of stainless steel, which has a solid walled portion 22a embracing the cap and base of the housing, and which has an openwork portion 22b extending beyond the cap and forming a cage around the hot junction 20. As is shown in Figure 1, the top portion of the base 11a has a reduced diameter forming a peripheral shoulder 23, and the cap 11b forms an even extension of this reduced-diameter portion of the base. The solid walled portion 22a of the shell has a peripheral offset 24 conforming to the shoulder 23 so as to embrace snugly the housing 11 along its entire length. Also, the shell has a second peripheral offset 25 which engages the outer rim portion of the cap 11b to securely hold the cap in seating engagement with the base 11a. A mounting bracket 26 having a central hole provided with an edge flange 27 tightly embraces the solid walled portion 22a. This bracket is abutted against the shoulder 24 and secured there in place by spot welding the flange 27 to the shell. The bracket may be oval-shaped and be provided with diametrically-opposite mounting holes 28 as shown in Figure 2.

In thermocouple-type fire alarm systems such as are currently used for detecting engine oil fires on aircraft, a series of thermocouples such as above described are mounted by their brackets 26 on the fire wall behind the engine, and have their base portions extending through respective apertures in the fire wall and their outer end portions (with the hot junctions 20) pointing toward the engine. In this application the thermocouples are constantly subjected to extremely heavy vibration, and upon outbreak of an engine oil fire they are subjected both to extremely high temperature and to aromatic hydrocarbons. It has been found in actual use that because of these extreme conditions there is required a more stable and sturdy construction of thermocouple than has been heretofore produced. The present invention resides in improved features of construction for such thermocouples which does enable them to withstand these rigorous conditions encountered in aircraft use.

To fulfil these rigorous construction requirements it is found, as a prime necessity, that looseness can never be permitted to develop between the inner housing and the outer shell for should looseness develop the heavy vibration will cause ultimate destruction and failure of the device.

Features of the inner housing, which are essential in preventing such looseness from ever occurring, are (1) in making it of a material that has substantially the same temperature coefficient of expansion as has the stainless steel shell 22, and (2) in using a material which is free from attack by aromatic hydrocarbons at oil-fire temperatures. It is found that glass-mica compositions, such for example as that commonly known as Mycalex, are materials having both of these properties. Furthermore, these glass-mica materials have the advantage that they can be molded to very close tolerances. When the inner housing has the same temperature coefficient as has the outer shell, the shell may grip the inner housing equally at all temperatures—i. e., at oil-fire temperatures as well as at normal temperatures—and therefore one possible condition which may cause looseness to develop is eliminated.

Further essential features in the present thermocouple construction are (1) in fitting the shell tightly onto the inner housing, and (2) in securing the shell positively thereto. This first feature is readily realized since the inner housing can be molded to very close dimensions, as above-mentioned. In order to realize the second feature a metal support ring 29 is molded into the base 11a flush with its peripheral surface. This support ring is made of a material—such as stainless steel—which has substantially the same temperature coefficient of expansion as has the housing material, and is provided with an inwardly-turned flange 29a which serves to lock the ring securely to the base. It is to this support ring that the shell is secured in order to hold the shell positively to the housing. In order that the shell may be secured integrally to the ring by spot welding the base 11a is provided with two diametrically-opposite recesses 30 in the bottom face thereof to expose portions of the inner wall of the ring and to provide access thereto for a spot-welding electrode (not shown). Thus, the shell can be fitted tightly onto the housing, and after being so assembled it can be spot welded as at 31 to the support ring to lock securely the shell to the inner housing.

It has been found that by incorporating the features herein described into the thermocouple construction, the thermocouple is able to withstand the extreme conditions of vibration and temperature that are encountered in aircraft use, and to do so through long periods of actual service.

The embodiment of my invention herein particularly shown and described is intended to be illustrative and not necessarily limitative of my invention, since the same is subject to changes and modifications in the details thereof without departure from the scope of my invention, which I endeavor to express according to the following claims.

I claim:

1. In a thermocouple construction comprising a pair of thermocouple elements joined to form a hot junction, and a pair of terminals joined to said elements to form cold junctions: the combination of a body refractory insulating material carrying said terminals and thermocouple elements, said hot junction being spaced a distance from said body, a metal shell having a solid-walled portion embracing said body and having an openwork portion extending therebeyond and surrounding said hot junction, said body and shell being characterized as having substantially equal temperature coefficients, a metal member molded into said body and having the outer face thereof exposed along the periphery of the body, said shell having a portion overlying said metal member and spot welded thereto, and said body having a recess therein providing access for a spot-welding electrode to the inner wall of the portion of said metal member welded to said shell.

2. In a thermocouple construction comprising a pair of thermocouple elements joined to form a hot junction, and a pair of terminals joined to said elements to form cold junctions: the combination of a cylindrical housing of refractory insulating material having an air space therewithin, said housing having one end wall traversed by said terminals and having another end wall traversed by said thermocouple elements with said cold junctions being exposed in said air space and said hot junction being exposed beyond said other wall, a metal shell embracing said housing and having an extending openwork portion surrounding said hot junction, said housing and shell being characterized as having substantially equal temperature coefficients, a metal ring molded into said housing and having the outer face thereof exposed at the periphery of said one end wall of the housing, said shell having a portion overlying said ring and spot welded thereto, and said housing having a recess in said one end wall providing access for a spot-welding electrode to the inner wall of the portion of said ring welded to said shell.

3. In a thermocouple construction comprising a pair of thermocouple elements joined to form a hot junction, and a pair of terminals joined to said elements to form cold junctions: the combination of a hollow cylindrical housing of a refractory moldable material, said terminals being molded to one end wall of said housing and said thermocouple elements extending through another end wall thereof, said elements being joined to said terminals within said housing to form cold junctions and being joined together beyond said other end wall to form a hot junction, a cylindrical metal shell embracing said housing and having substantially the same temperature coefficient, said shell having a cage portion extending beyond said housing and surrounding said hot junction, a metal ring molded into said one end portion of said housing flush with the periphery thereof and having a portion in interlocking engagement with the housing, said housing, ring and shell being characterized as having substantially equal temperature coefficients, said shell having an end portion overlying said ring and welded thereto at points substantially diametrically opposite the central axis of the housing, and said housing having diametrically-opposite recesses in said one end wall thereof providing access for a spot-welding electrode to the inner wall of said ring.

4. In a thermocouple construction comprising a hollow housing of refractory insulating material, a pair of terminals in one end wall of said housing, a pair of thermocouple elements traversing another end wall of said housing, said elements being joined to said terminals within said housing to form cold junctions and being joined together beyond said housing to form a hot junction: the combination of a metal band embracing said housing near said one end and having a portion moulded in interlocking relation with the housing, said band and housing being characterized as having substantially equal temperature coefficients, and a metal shell embracing said housing and having an apertured portion surrounding said hot junction, said shell having a portion overlying said band and welded thereto, and said housing having a recess in said one end wall thereof providing access for a spot-welding electrode to the inner wall of said band.

DWIGHT A. WRIGLEY.

REFERENCES CITED

The following references are of record in the file of this patent:

UNITED STATES PATENTS

| Number | Name | Date |
| --- | --- | --- |
| 1,376,905 | Sturges | May 3, 1921 |
| 1,526,641 | Mulvany et al. | Feb. 17, 1925 |
| 2,304,489 | Wetzel | Dec. 8, 1942 |
| 2,307,956 | Ray | Jan. 12, 1943 |